United States Patent Office 3,057,883
Patented Oct. 9, 1962

3,057,883
2-CARBOXY-ANDROSTANE DERIVATIVES AND PROCESS THEREOF
Albert Bowers, John Edwards, and James C. Orr, all of Mexico City, Mexico, assignors to Syntex Corporation, a corporation of Panama
No Drawing. Filed Oct. 20, 1961, Ser. No. 146,456
Claims priority, application Mexico Apr. 4, 1961
23 Claims. (Cl. 260—397.1)

The present invention relates to certain new cyclopentanoperhydrophenanthrene derivatives and to a method for the preparation of the same.

More particularly, our invention relates to the novel $2\alpha$ and $2\beta$-carboxy derivaives of androstan-17$\beta$-ol, and to 2-carboxy-$\Delta^2$-androsten-17$\beta$-ol which may further possess a 17$\alpha$-alkyl, alkenyl or alkynyl group; it also comprises the preparation of the esters of such compounds and the corresponding 19-nor derivatives.

Such compounds are powerful anabolic agents having a favorable anabolic-androgenic ratio; they stimulate the appetite, help to increase the protein metabolism and the deposition of calcium in the bone tissue; they further show anti-estrogenic activity, lower the chloesterol level in the blood, inhibit the scretion of gonadotrophins by the pituitary gland and exhibit depressant action on the central nervous system.

The 17$\alpha$-alkenyl and 17$\alpha$-alkynyl compounds further possess progestational activity.

The novel compounds object of our present invention are represented by the following formulas:

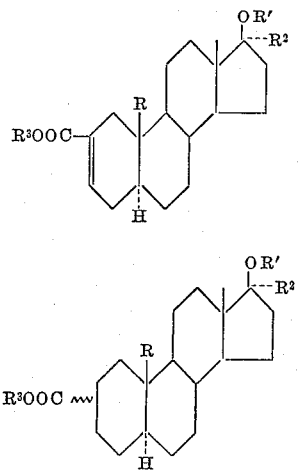

In the above formulas, R represents hydrogen or methyl, $R^1$ represents hydrogen or an acyl group derived from a carboxylic acid of 1 to 12 carbon atoms; $R^2$ represents hydrogen, a lower alkyl, alkenyl or alkynyl group such as methyl, ethyl, propyl, vinyl, ethynyl or propynyl, and $R^3$ represents hydrogen or a lower alkyl group such as methyl, ethyl or propyl. The wavy line at C–2 indicates the $\alpha$ or $\beta$ configuration for the substituent at such position.

The acyl groups referred to above derive from a carboxylic acid of less than 12 carbon atoms, saturated or unsaturated, of straight, branched, cyclic or mixed aliphatic-cyclic chain, substituted or not with hydroxyl, methoxy, amino, halogen or other groups; typical such esters are the acetate, propionate, butyrate, valerate, hemisuccinate, enanthate, caproate, benzoate, undecenoate, trimethylacetate, phenoxyacetate, cyclopentylpropionate and $\beta$-chloropropionate.

The novel compounds object of our invention are obtained by oxidation of 2-formyl-17$\beta$-hydroxy-$\Delta^2$-androstenes, 2-hydroxymethyl-17$\beta$-hydroxy-$\Delta^2$-androstenes, $2\alpha$ and $2\beta$-hydroxymethyl-17$\beta$-hydroxy-androstanes, of their 17$\alpha$-alkyl, alkenyl and alkynyl substituted derivatives as well as of their corresponding 19-nor-analogs.

In copending patent application Serial No. 128,974, filed August 3, 1961, there is described the preparation of 2-formyl-$\Delta^2$-androstenes starting from 2-alkoxymethylene derivatives of dihydroallotestosterone, 19-nor-dihydroallotestosterone and of their 17$\alpha$-alkyl, alkenyl or alkynyl substituted derivatives, which upon reduction with a double metal hydride afford the corresponding 2-hydroxymethyl compounds which, by acid treatment, give rise to the formation of the 2-formyl-$\Delta^2$-androstenes and 19-nor-androstenes.

By reduction of these compounds with lithium in liquid ammonia there are obtained the $2\alpha$-hydroxymethyl-androstanes and 19-nor-androstanes. By catalytic hydrogenation of the 2-formyl-$\Delta^2$-androstenes and 19-nor-androstenes, there are obtained the $2\beta$-hydroxymethyl compounds, as has been described in detail in copending patent application Serial No. 128,972, filed August 3, 1961.

The 2 - hydroxymethyl - 17$\beta$ - hydroxy-$\Delta^2$-androstenes which may also be employed as starting materials for the preparation of the 2-carboxy-androstenes object of our present invention, are obtained by reducing the 2-formyl-$\Delta^2$-androstenes with sodium borohydride, such as has been described in the patent application Serial No. 146,455 filed of even date.

The novel compounds object of our invention are obtained by the method illustrated by the following series of reactions:

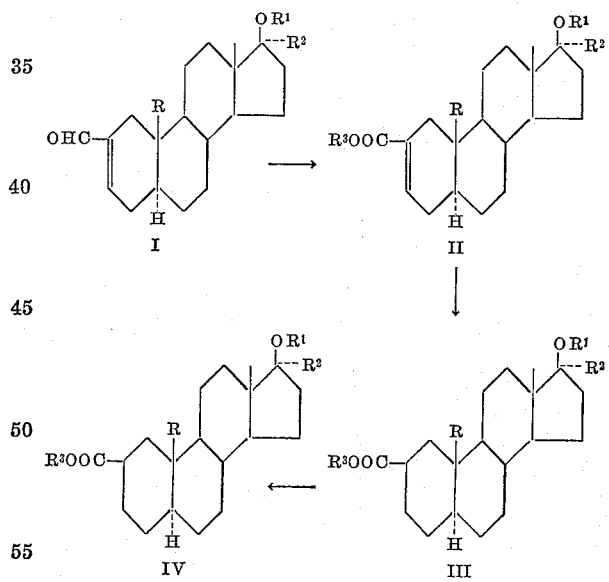

In the above formulas, R, $R^1$, $R^2$ and $R^3$ have the same meaning set forth previously.

In practicing the process outlined above, an ester of 2-formyl-$\Delta^2$-androsten-17$\beta$-ol or a 17$\alpha$-substituted derivative thereof (I; R=methyl) or an ester of the latter is subjected to direct oxidation with oxygen in the presence of platinum oxide as catalyst to produce the 2-carboxy compounds (II; R=methyl, $R^3$=hydrogen). Adequate solvents for this oxidation are ethyl acetate, hexane, butyl acetate or any other similar organic ester. The reaction is preferably conducted at room temperature and atmospheric pressure, for a period of time between 72 and 100 hours or under pressure for 24 to 36 hours.

Alternatively, such oxidation may be carried out with chromium trioxide in acetic acid or in acetone in sulfuric acid medium.

The ester group at C-17β may be saponified to give the corresponding 17β-alcohol (II; R, $R^1$ and $R^3$=hydrogen), which may be esterified with another acid anhydride or chloride in pyridine solution for the unsubstituted compounds, or in benzene solution and in the presence of p-toluenesulfonic acid for the 17α-alkyl, alkenyl and alkynyl substituted derivatives.

By catalytic hydrogenation of the 2-carboxy-Δ²-androstenes, in the presence of a palladium catalyst, such as 5% palladium on charcoal, palladium on barium sulfate or 10% palladium on calcium carbonate, and using as solvents ethyl acetate, methanol, ethanol, there are obtained the 2β-carboxy derivatives (III; R=methyl; $R^1$ and $R^3$=hydrogen).

By esterification of the 2-carboxy compounds of Formulas II and III (R=methyl; $R^1$ and $R^3$=hydrogen) with a diazoalkane, such as diazomethane or diazoethane, there are obtained the 2-carbalkoxy compounds (II and III; R=methyl, $R^1$=hydrogen, $R^3$=methyl or ethyl). By esterification with an acid anhydride or chloride, by the methods set forth above, there are obtained the diesters.

By alkaline treatment of the 2β-carbalkoxy compounds, there are obtained the 2α-carbalkoxy derivatives (IV; R=methyl, $R^3$=methyl, ethyl)

In the same manner, the method just described is applied to the 2-formyl-19-nor-Δ²-androstenes, thus producing the 17-esters of 2-carboxy-19-nor-Δ²-androsten-17β-ol, the 17-esters of 2β-carboxy-19-nor-androstan-17β-ol, 2-carboxy-17α-alkyl, 17α-alkenyl and 17α-alkynyl-19-nor-Δ²-androsten - 17β - ol, 2β-carboxy-17α-alkyl, 17α-alkenyl and 17α-alkynyl-19-nor-androstan-17β-ol, 2α and 2β-carbalkoxy-19-nor-androstan-17β-ol, 2α and 2β-carbalkoxy-17α-alkyl, 17α-alkenyl and 17α-alkynyl-19-nor-androstan-17β-ol, as well as the 17-esters of the carbalkoxy compounds.

Alternatively, the 2α- and 2β-carboxy derivatives of androstan-17β-ol, 19-nor-androstan-17β-ol as well as of their 17α-alkyl, alkenyl and alkynyl substituted derivatives may be obtained by oxidation with chromic acid of the corresponding 2α and 2β-hydroxymethyl compounds and/or of their esters.

The following examples serve to illustrate but are not intended to limit the scope of the invention:

*Example I*

To a solution of 2.5 g. of the acetate of 2-formyl-Δ²-androsten-17β-ol, described in copending patent application Serial No. 128,974, filed August 3, 1961, in 250 cc. of ethyl acetate was added 400 mg. of platinum oxide and the mixture was stirred under an atmosphere of oxygen, at atmospheric pressure and room temperature, for 80 hours. The catalyst was removed by filtration through celite and the solvent was evaporated. Crystallization of the residue from acetone-ether yielded the acetate of 2-carboxy-Δ²-androsten-17β-ol, M.P. 267–68° C., $[\alpha]_D$ +67° (chloroform); λ max. 218 mμ, ε 9100.

A solution of 3 g. of the above compound in 100 cc. of methanol was treated with 3 g. of potassium hydroxide dissolved in 5 cc. of water and 20 cc. of methanol, and the mixture was kept overnight at room temperature, then acidified with acetic acid and concentrated to a small volume. Water was added until complete precipitation and the product was collected by filtration. Crystallization from methylene chloride-hexane afforded 2-carboxy-Δ²-androsten-17β-ol, M.P. 243–244° C., λ max. 219 mμ, ε 8,700.

In the same manner the propionate of 2-formyl-19-nor-Δ²-androsten-17β-ol was converted into the propionate of 2-carboxy-19-nor-Δ²-androsten-17β-ol and then into 2-carboxy-19-nor-Δ²-androsten-17β-ol.

*Example II*

A stirred solution of 700 mg. of 2-formyl-17α-methyl-Δ²-androsten-17β-ol in 10 cc. of pure acetone was cooled to 0° C. and treated with 0.4 cc. of an 8 N solution of chromic acid (prepared in 23% sulfuric acid) and the mixture was kept for 1 hour at 0° C. At the end of this time the mixture was poured into water and the precipitate formed was collected and washed with water. Crystallization from acetone afforded 2-carboxy-17α-methyl-Δ²-androsten-17β-ol.

A mixture of 250 mg. of the above compound, 10 cc. of acetic acid, 5 cc. of acetic anhydride and 250 mg. of p-toluenesulfonic acid was kept at room temperature for 1 hour, poured into water, heated on the steam bath for 30 minutes to hoydrolyze the excess of reagent and the precipitate formed was collected and washed with water to neutral, thus giving the acetate of 2-carboxy-17α-methyl-Δ²-androsten-17β-ol.

*Example III*

A solution of 1 g. of 2-carboxy-Δ²-androsten-17β-ol, obtained in Example I, in 15 cc. of methanol was cooled to 0–5° C. and treated with an excess of an ether solution of diazomethane, prepared from 5 g. of nitrosomethylurea; the mixture was kept overnight at 0° C., the excess of diazomethane was destroyed with a few drops of acetic acid and the solution was poured into water and extracted with methylene chloride; the organic phase was washed to neutral, dried and evaporated to dryness. Crystallization of the residue from acetone-hexane yielded 2-carbomethoxy-Δ²-androsten-17β-ol.

A solution of 250 mg. of the above ester in 1 cc. of pyridine was mixed with 0.5 cc. of benzoyl chloride and heated on the steam bath for 1 hour, cooled and poured into water; the precipitate formed was collected and recrystallized from chloroform-methanol, thus furnishing the beonzoate of 2-carbomethoxy-Δ²-androsten-17β-ol.

*Example IV*

A solution of 500 mg. of 2-formyl-17α-ethynyl-19-nor-Δ²-androsten-17β-ol was treated with an excess of an 8 N solution of chromic acid in acetone, following the method of Example II. There was thus obtained 2-carboxy-17α-ethynyl-Δ²-19-nor-androsten-17β-ol.

By treating the above compound with an excess of diazomethane, in accordance with the method of the preceding example, there was obtained the methyl ester of 2-carboxy-17α-ethynyl-19-nor-Δ²-androsten-17β-ol.

A mixture of 250 mg. of the above methyl ester, 15 cc. of benzene, 1 cc. of acetic anhydride and 500 mg. of p-toluenesulfonic acid was kept at room temperature for 48 hours and then diluted with water; the benzene layer was separated, successively washed with 5% sodium carbonate solution and water, dried over anhydrous sodium sulfate and evaporated to dryness under reduced pressure. By chromatography of the residue followed by crystallization of the solid fractions from acetone-ether, there was obtained the acetate of 2-carbomethoxy-17α-ethynyl-19-nor-Δ²-androsten-17β-ol.

In the same manner, but using the respective acid anhydrides, there were obtained the caproate, propionate and cyclopentylpropionate of 2-carbomethoxy - 17α - ethynyl-19-nor-Δ²-androsten-17β-ol.

*Example V*

A solution of 500 mg. of the caproate of 2-formyl-17α-vinyl-Δ²-androsten-17β-ol in 65 cc. of ethyl acetate was stirred for 75 hours under an atmosphere of oxygen and in the presence of 80 mg. of platinum oxide catalyst, at room temperature and atmospheric pressure; there was thus obtained the caproate of 2-carboxy-17α-vinyl-Δ²-androsten-17β-ol.

By treating the above compound with an excess of diazomethane, there was obtained the caproate of 2-carbomethoxy-17α-vinyl-Δ²-androsten-17β-ol.

*Example VI*

A stirred solution of 1.4 g. of 2-hydroxymethyl-17α-methyl-Δ²-androsten-17β-ol, described in copending patent application Serial No. 146,455 in 25 cc. of pure acetone was treated with 1.6 cc. of an 8 N solution of chromic acid, following the method described in Example II; there was thus obtained 2-carboxy-17α-methyl-Δ²-androsten-17β-ol, identical with that obtained in such example. By esterification with an ether solution of diazoethane, there was obtained 2-carboethoxy - 17α - methyl-Δ²-androsten-17β-ol.

*Example VII*

A stirred solution of 1 g. of the acetate of 2β-hydroxymethylandrostan-17β-ol, obtained as described in the copending patent application Serial No. 128,972, in 50 cc. of acetic acid was treated dropwise with a solution of 500 mg. of chromic acid in 10 cc. of 80% acetic acid, at a temperature between 15 and 20° C. The mixture was kept for 2 hours at room temperature, then poured into ice cold salt water and the precipitate formed was collected and washed with water to neutral, thus giving the acetate of 2β-carboxy-androstan-17β-ol, which was purified by crystallization from chloroform-methanol.

The above compound was treated with an excess of diazomethane, thus yielding the respective methyl ester.

*Example VIII*

By following the method of the preceding example, 2β-hydroxymethyl-17α-methyl-androstan-17β-ol, 2β-hydroxymethyl-17α-ethynyl-androstan-17β-ol, and 2β-hydroxymethyl-17α-ethynyl-19-nor-androstan-17β-ol were oxidized with an excess of chromic acid in acetic acid to produce, respectively, 2β-carboxyl-17β-methyl-androstan - 17β - ol, 2β-carboxy-17α-ethynyl-androstan - 17β - ol, and 2β-carboxy-17α-ethynyl-19-nor-androstan-17β-ol. By treating these compounds with an ether solution of diazomethane, there were obtained the respective methyl esters, which were then esterified with acetic anhydride in benzene solution and in the presence of p-toluenesulfonic acid, thus giving finally the acetate of 2β-carbomethoxy-17α-methyl-androstan-17β-ol, the acetate of 2β-carbomethoxy-17α-ethynylandrostan-17β-ol and the acetate of 2β-carbomethoxy-17α-ethynyl-19-nor-androstan-17β-ol.

*Example IX*

There was repeated the method of Example VI, but using 2α-hydroxymethyl-17α-methyl-androstan-17β-ol as starting compound, thus obtaining 2α-carboxy-17α-methyl-androstan-17β-ol and 2α-carbomethoxy-17α-methyl-androstan-17β-ol.

500 mg. of the above compound was esterified with propionic anhydride in benzene solution and in the presence of p-toluenesulfonic acid, by following the method described in Example IV. There was thus obtained the propionate of 2-carbomethoxy - 17α - methyl - androstan-17β-ol.

*Example X*

A solution of 2 g. of the benzoate of 2-carbomethoxy-Δ²-androsten-17β-ol, obtained as described in Example III, in 100 cc. of ethyl acetate was hydrogenated at room temperature and atmospheric pressure in the presence of 200 mg. of 5% palladium on charcoal which had been previously reduced. When the equivalent of 1.1 mols of hydrogen had been absorbed, the catalyst was removed by filtration and the filtrate was evaporated to dryness. Crystallization of the residue from chloroform-methanol furnished the benzoate of 2β-carbomethoxy-androstan-17β-ol.

The above compound was saponified by following the method of Example I, with simultaneous inversion of the carboxyl group at C-2, thus producing 2α-carbomethoxy-androstan-17β-ol.

A solution of 500 mg. of the above compound in 2 cc. of pyridine was treated with 1 cc. of acetic anhydride and the mixture was kept overnight at room temperature. After pouring into water, the precipitate formed was collected, thus furnishing the acetate of 2α-carbomethoxy-androstan-17β-ol.

By the same method but using caproic, undecenoic and cyclopentylpropionic anhydrides as esterifying agents, there were obtained the caproate, undecenoate and cyclopentylpropionate of 2α-carbomethoxy-androstan-17β-ol.

*Example XI*

A solution of 1.2 g. of 2α-hydroxymethyl-17α-vinyl-19-nor-androstan-17β-ol in 60 cc. of acetic acid was treated with 0.6 g. of chromic acid in 15 cc. of acetic acid, in accordance with the method of Example VII, thus giving 2α-carboxyl-17α-vinyl-19-nor-androstan-17β-ol. By esterifying the above compound with acetic anhydride in benzene solution and in the presence of p-toluenesulfonic acid, there was obtained the acetate of 2α-carboxy-17α-vinyl-19-nor-androstan-17β-ol.

*Example XII*

By following the method of hydrogenation described in Example X, 1 g. of 2-carboethoxy-17α-methyl-Δ²-androsten-17β-ol, obtained as described in Example VI, was converted into 2β - carboethoxy - 17α - methyl-androstan-17β-ol. This compound was treated with a mixture of acetic anhydride and acetic acid in the presence of p-toluenesulfonic acid, in accordance with the method of esterification of Example II, and thus there was obtained the acetate of 2β-carboethoxy-17α-methyl-androstan-17β-ol.

*Example XIII*

2 g. of 2-hydroxymethyl-17α-ethyl-Δ²-androsten-17β-ol was oxidized with 8 N chromic acid in acetone, in accordance with the method of Example VI to produce 2-carboxy-17α-ethyl-Δ²-androsten-17β-ol.

The above compound was hydrogenated in accordance with the method of Example II, to produce 2β-carboxy-17α-ethyl-androstan-17β-ol.

The above compound was treated with an excess of diazomethane in ether solution to yield 2β-carbomethoxy-17α-ethyl-androstan-17β-ol.

A mixture of 800 mg. of the above methyl ester and 20 cc. of a 1% solution of sodium hydroxide in methanol was kept at room temperature for 30 minutes and then poured into ice cold salt water. The product was extracted with methylene chloride and the extract was washed with water to neutral, dried over anhydrous sodium sulfate and evaporated to dryness, thus affording 2α-carbomethoxy-17α-ethyl-androstan-17β-ol.

By esterifying the above compound with cyclopentylpropionic anhydride in benzene solution and in the presence of p-toluenesulfonic acid, there was produced the cyclopentylpropionate of 2α - carbomethoxy - 17α - ethyl-androstan-17β-ol.

*Example XIV*

By following the method of Example VI, 2α-hydroxymethyl-17α-ethynyl-androstan - 17β - ol and 2α - hydroxymethyl-17α-ethynyl-19-nor-androstan-17β-ol were oxidized with an excess of 8 N chromic acid in acetone, thus producing 2α-carboxy-17α-ethynyl - androstan - 17β-ol and its 19-nor derivative. By reacting these compounds with an ether solution of diazoethane, there were obtained the corresponding ethyl esters, i.e., 2α - carboethoxy - 17α-ethynyl-androstan-17β-ol and 2α-carboethoxy-17α-ethynyl-19-nor-androstan-17β-ol.

*Example XV*

A solution of 1 g. of 2-carboxy-19-nor-Δ²-androsten-17β-ol, obtained in Example I, in 75 cc. of methanol was hydrogenated in the presence of 100 mg. of 5% palladium on charcoal, following the method of Example X. There was thus obtained 2β-carboxy-19-nor-androstan - 17β - ol, which upon treatment with an excess of diazomethane produced 2β-corbomethoxy-19-nor - androstan - 17β - ol. Acetylation of this compound by conventional methods furnished the acetate of 2β-carbomethoxy-19-nor-androstan-17β-ol.

*Example XVI*

A mixture of 500 mg. of 2β-carbomethoxy-19-nor-androstan-17β-ol and 15 cc. of a 1% solution of potassium hydroxide in methanol was kept at room temperature for 1 hour, then poured into water and the precipitate formed was collected, thus yielding 2α-carbomethoxy-19-nor-androstan-17β-ol.

By esterification of the above compound with benzoyl chloride in pyridine, in accordance with the method described in Example III, there was obtained the benzoate of 2α-carbomethoxy-19-nor-androstan-17β-ol.

We claim:
1. A compound of the following formula:

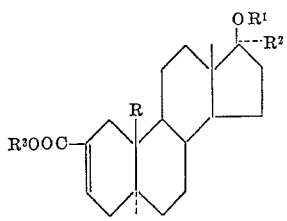

wherein R is selected from the group consisting of hydrogen and methyl; $R^1$ is selected from the group consisting of hydrogen and a hydrocarbon carboxylic acyl group of less than 12 carbon atoms; $R^2$ is selected from the group consisting of hydrogen, lower alkyl, lower alkenyl, and lower alkynyl; and $R^3$ is selected from the group consisting of hydrogen and lower alkyl.

2. 2-carboxy-$\Delta^2$-androsten-17β-ol.
3. The acetate of 2-carboxy-$\Delta^2$-androsten-17β-ol.
4. 2-carboxy-19-nor-$\Delta^2$-androsten-17β-ol.
5. 2-carboxy-17α-methyl-$\Delta^2$-androsten-17β-ol.
6. 2-carboxy-17α-ethynyl-$\Delta^2$-androsten-17β-ol.
7. 2-carboxy-17α-vinyl-$\Delta^2$-androsten-17β-ol.
8. 2-carbomethoxy-$\Delta^2$-androsten-17β-ol.
9. The acetate of 2-carbomethoxy-17α-ethynyl-$\Delta^2$-androsten-17β-ol.
10. The acetate of 2-carbomethoxy-17α-methyl-$\Delta^2$-androsten-17β-ol.
11. A compound of the following formula:

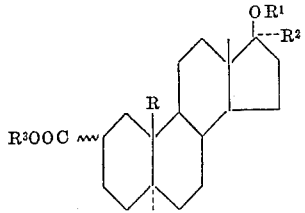

wherein R is selected from the group consisting of hydrogen and methyl; $R^1$ is selected from the group consisting of hydrogen and a hydrocarbon carboxylic acyl group of less than 12 carbon atoms; $R^2$ is selected from the group consisting of hydrogen, lower alkyl, lower alkenyl and lower alkynyl and $R^3$ is selected from the group consisting of hydrogen and lower alkyl.

12. 2α-carboxy-androstan-17β-ol.
13. 2β-carboxy-androstan-17β-ol.
14. 2α-carboxy-17α-methyl-androstan-17β-ol.
15. 2α-carboxy-17α-ethynyl-androstan-17β-ol.
16. 2β-carboxy-17α-ethynyl-androstan-17β-ol.
17. 2α-carboxy-19-nor-androstan-17β-ol.
18. 2β-carboxy-19-nor-androstan-17β-ol.
19. 2α-carbomethoxy-17α-methyl-androstan-17β-ol.
20. 2β-carbomethoxy-19-nor-androstan-17β-ol.
21. 2α-carboethoxy-17α-ethynyl-androstan-17β-ol.
22. A process for preparing a compound of the following formula:

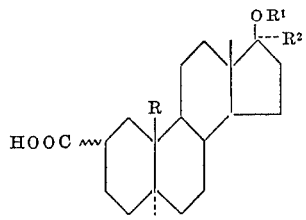

wherein R is selected from the group consisting of hydrogen and methyl; $R^1$ is selected from the group consisting of hydrogen and a hydrocarbon carboxylic acyl group of less than 12 carbon atoms; and $R^2$ is selected from the group consisting of hydrogen, lower alkyl, lower alkenyl and lower alkynyl, comprising oxidizing a C–17-hydrocarbon carboxylic acid ester of the corresponding 2-hydroxymethyl-androstan-17β-ol derivative and thereafter saponifying the ester group.

23. A process for preparing a compound of the following formula:

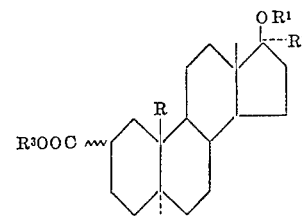

wherein R is selected from the group consisting of hydrogen and methyl; $R^1$ is selected from the group consisting of hydrogen and a hydrocarbon carboxylic acyl group of less than 12 carbon atoms; $R^2$ is selected from the group consisting of hydrogen, lower alkyl, lower alkenyl and lower alkynyl ; and $R^3$ is selected from the group consisting of hydrogen and lower alkyl, comprising oxidizing a compound of the following formula:

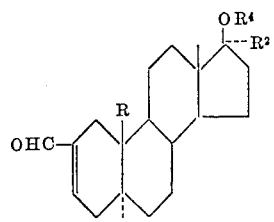

wherein R and $R^2$ have the same meaning as above and $R^4$ represents the hydrocarbon carboxylic acyl group to form the corresponding 2-carboxy-$\Delta^2$-androsten-17β-ol-17-acylate derivative, hydrogenating the latter in the presence of a hydrogenation catalyst to produce the corresponding 2β-carboxy-androstan-17β-ol compound, esterifying the latter with a diazoalkane to produce the corresponding 2β-carboalkoxy-androstan-17β-ol compound and then treating the latter with an alkali to produce the corresponding 2α-carboalkoxy-androstan-17β-ol.

No references cited.